(No Model.)

O. TOWER.
HARROW.

No. 434,962. Patented Aug. 26, 1890.

Witnesses
Chas. J. Williamson.
Wm. C. Conn.

Inventor
Oscar Tower
per Chas. H. Fowler
Attorney

UNITED STATES PATENT OFFICE.

OSCAR TOWER, OF WILSON, NEW YORK.

HARROW.

SPECIFICATION forming part of Letters Patent No. 434,962, dated August 26, 1890.

Application filed July 29, 1889. Renewed July 24, 1890. Serial No. 359,734. (No model.)

*To all whom it may concern:*

Be it known that I, OSCAR TOWER, a citizen of the United States, residing at Wilson, in the county of Niagara and State of New York, have invented certain new and useful Improvements in Harrows; and I do hereby declare that the following is a full, clear, and exact description of the same, reference being had to the annexed drawings, making a part of this specification, and to the letters of reference marked thereon.

Figure 1:
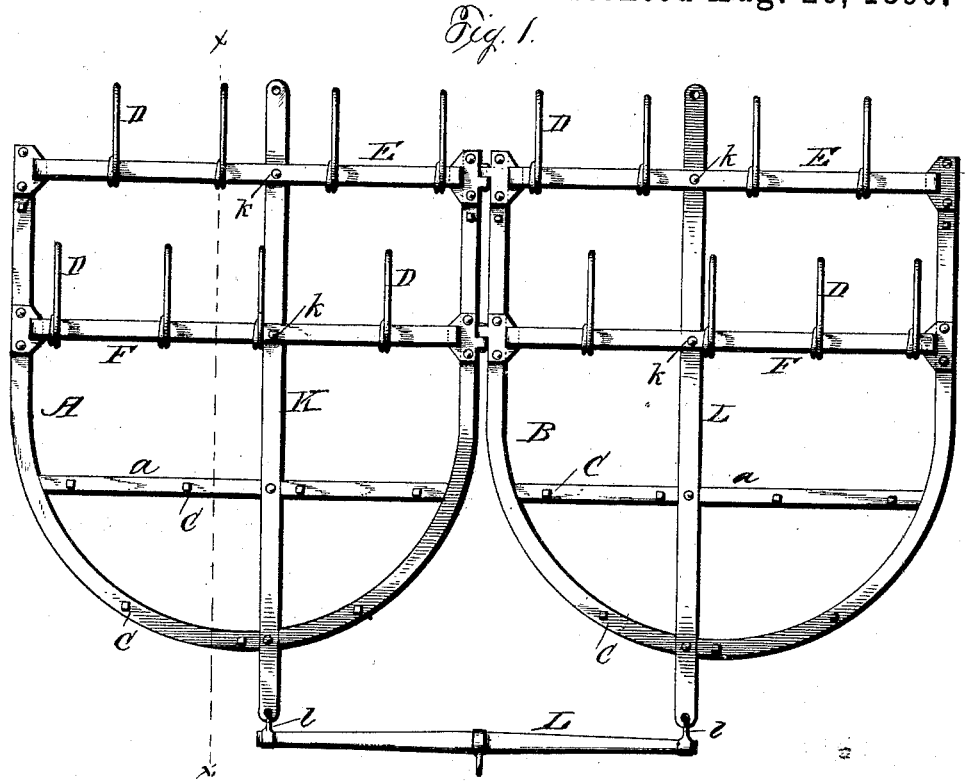
Figure 2:
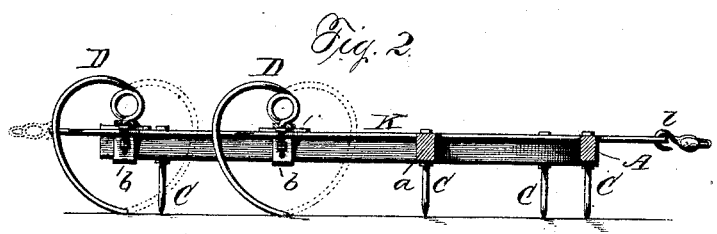
Figure 3:
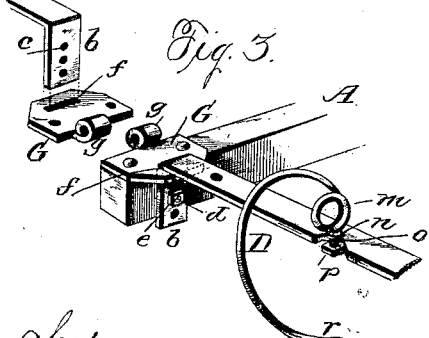
Figure 4:
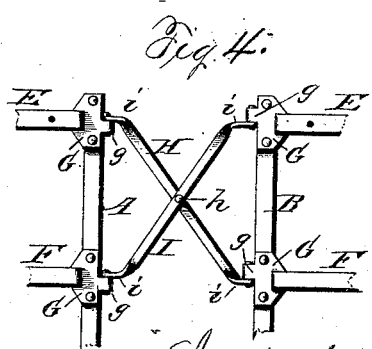

Figure 1 of the drawings is a top plan view of my improved harrow; Fig. 2, a sectional elevation taken on line $x$ $x$ of Fig. 1; Fig. 3, a detail view in perspective, showing the manner of connecting the spring-tooth bars to the harrow-frames; Fig. 4, a detail plan view showing the spreader attachment for connecting the two harrow-frames together.

The present invention has relation to that class of drag-harrows in which two independent frames are employed, which are hinged together and provided with suitable teeth, such frames having a yielding motion independent of each other.

The purpose of the invention is to improve this class of harrows, whereby the spring rake-teeth upon each bar can all be raised or lowered simultaneously and uniformly and the position of the teeth reversed and provision made for the spreading of the harrow-frames, all of which objects I attain by the means substantially as shown in the drawings, and hereinafter described and claimed.

In the accompanying drawings, A B represent the segmental harrow-frames, which are provided with the vertical teeth C, of any preferred form and construction, and connected to the frame in any well-known and desirable manner, each frame having a transverse brace $a$, to which are also connected the vertical teeth C.

The spring-teeth D, which will be described hereinafter, are removably connected to the transverse bars E F, which are also removably and adjustably connected to the harrow-frames. These tooth-bars have their ends bent to extend downwardly, as shown at $b$, and are provided with a series of holes $c$, to receive the projecting end of a bolt $d$, secured to the inner side of the harrow-frame, a nut $e$ engaging with the screw-threads on the bolt, which securely and firmly connects the tooth-bar to the frame and enables it to be adjusted by raising or lowering it, or removed and replaced in a reverse position. The downwardly-bent ends $b$ extend through slots $f$ in plates G, which are firmly bolted to the harrow-frame, the inner ones of said plates serving as hinges to connect the two frames A B together, and have eyes $g$, through which pass a suitable pin in the manner of a butt-hinge.

When it is desired to extend the harrow-frames over a greater area of surface to more conveniently work around trees without the necessity of the horse and driver going under them, I provide what I term a "spreader," which consists of two rods H I connected at $h$, said bars crossing each other in the form of an X, to serve also as braces to the frames at the point of connection. These rods have bent ends $i$, through which a pin or bolt passes to connect them to the eyes $g$ of the plates G, these pins or bolts being of any well-known construction that will admit of the ready removal of the spreader when it is desired to connect the two frames as shown in Fig. 1. It should be understood that the tooth-bars E F are connected to the draw-bars K L by means of removable bolts $k$ to admit of said tooth-bars being readily removed therefrom when necessary. The draw-bars are bolted to the harrow-frames and to the braces $a$ thereof, and said bars extend beyond the frames for convenience of attaching to either of their ends the bar L, which is provided with hooks $l$ for the purpose. The spring-teeth D have a coil at $m$ and shoulder $n$, and below this shoulder is a screw-shank $o$, which passes through a hole in the tooth-bar and is held thereto by a nut $p$, engaging with the threads upon the shank, thereby making provision for the ready removal of teeth D independent of each other when it is not desired to remove the bar to which they are attached. Thus the teeth may be reversed, as shown in dotted lines, Fig. 2, by either removing the teeth themselves and replacing them on the bar in a reverse position or reversing the bar without removing the teeth. By raising and lowering the bar the teeth thereon are adjusted alike and uniformly, and the teeth retain the same position throughout the length of the bar whether set deep or shallow. The bar L can be attached to either end of the draw-bars K L, and the frames A D drawn in opposite directions to that shown in Fig. 1, and by reversing the spring-teeth, as shown in dotted lines, Fig. 2, the teeth will follow after to smooth the surface of the harrowed ground, the ends of the teeth being flattened, as shown at r, for the purpose. The vertical teeth C, working in front, break the ground and make less strain on the spring-teeth, and consequently they are less liable to injury, while the draft is much less, and, with the two combined, the vertical teeth hold up the harrow-frame and steady it, while the spring-teeth when reversed make a perfect smoothing-harrow, leveling the ridges and uneven places and making the surface smooth and even.

A perfectly operating harrow is provided which possesses many advantages not found in those now in use, and its strength and durability are of material importance in a harrow of this class.

Having now fully described my invention, what I claim as new, and desire to secure by Letters Patent, is—

1. The tooth-bars carrying spring-teeth D, and having bent ends b, with holes c, and a fastening consisting of a bolt and nut, in combination with the plates G, having slots f, through which the bent ends of the tooth-bars pass, substantially as and for the purpose described.

2. The harrow-frames A B, having the plates G and eyes g thereto, in combination with the spreading device consisting of the rods H I, connected together in the form of an X, and having the ends i connected to the eyes g of the plates, substantially as and for the purpose set forth.

In testimony that I claim the above I have hereunto subscribed my name in the presence of two witnesses.

OSCAR TOWER.

Witnesses:
A. N. DWIGHT,
E. G. BARNUM.